United States Patent [19]
Kaplan et al.

[11] Patent Number: 5,241,459
[45] Date of Patent: Aug. 31, 1993

[54] INTEGRATING CYLINDER WITH END INPUT ILLUMINATION FOR USE AS AN ILLUMINATOR IN A FILM SCANNER

[75] Inventors: Martin C. Kaplan; Andrew F. Kurtz; Russell J. Palum, all of Rochester, N.Y.

[73] Assignee: Eastman Kodak Company, Rochester, N.Y.

[21] Appl. No.: 891,143

[22] Filed: Jun. 1, 1992

[51] Int. Cl.$^5$ ............................................. F21V 7/00
[52] U.S. Cl. ................................... 362/298; 250/228; 250/349
[58] Field of Search ............... 362/346, 347, 349, 298, 362/297; 250/228; 356/236

[56] References Cited

U.S. PATENT DOCUMENTS

| | | | |
|---|---|---|---|
| 4,186,431 | 1/1980 | Engel et al. | 362/223 |
| 4,471,228 | 9/1984 | Nishizawa et al. | 250/578 |
| 4,710,624 | 12/1987 | Alvarez et al. | 250/228 |
| 4,797,711 | 1/1989 | Sasada et al. | 355/32 |
| 4,868,383 | 9/1989 | Kurtz et al. | 250/228 |
| 4,899,040 | 2/1990 | Davis et al. | 250/216 |
| 4,933,779 | 6/1990 | Milch | 358/489 |
| 5,012,346 | 4/1991 | DeJager et al. | 358/214 |
| 5,103,385 | 4/1992 | Federico et al. | 362/298 |

FOREIGN PATENT DOCUMENTS 1-116630  5/1989  Japan .

*Primary Examiner*—Carroll B. Dority
*Attorney, Agent, or Firm*—David M. Woods

[57] ABSTRACT

An integrating cylinder for use as an illuminator for a film scanner includes a hollow cylinder including an inner surface defining a cavity therein and an outer surface, a diffusing layer of reflective material covering an inner surface of the hollow cylinder, a first end plate for sealing a near end of the hollow cylinder, and a second end plate for sealing a far end of the hollow cylinder opposite the near end. The hollow cylinder defines a slit formed parallel to a longitudinal axis of the hollow cylinder between the inner and outer surfaces at a predetermined line along a circumference of the hollow cylinder. The first end plate defines a hole which is decentered from the longitudinal axis of the hollow cylinder and can be tilted at a predetermined angle to the longitudinal axis of the hollow cylinder towards an area of the inner surface of the hollow cylinder. Additionally, the hole is located at a predetermined angular separation around the circumference of the hollow cylinder from the slit for receiving a light beam directed at the predetermined angle to the longitudinal axis into the cavity. After reflections in the cavity, the light emerges from the slit to form a line of uniform diffuse light.

17 Claims, 6 Drawing Sheets

PERPENDICULAR SCAN ANGLE (37) AT SLIT NEAR END

PARALLEL SCAN ANGLE (38) AT SLIT NEAR END

PERPENDICULAR SCAN ANGLE (37) AT SLIT CENTER

PARALLEL SCAN ANGLE (38) AT SLIT CENTER

PERPENDICULAR SCAN ANGLE (37) AT SLIT FAR END

PARALLEL SCAN ANGLE (38) AT SLIT FAR END

INTEGRATING CYLINDER WITH END INPUT ILLUMINATION FOR USE AS AN ILLUMINATOR IN A FILM SCANNER

FIELD OF THE INVENTION

The present invention relates to an illuminator for a film scanner, and more particularly, to an illuminator for a film scanner comprising an integrating cylinder with end input illumination.

BACKGROUND OF THE INVENTION

Various arrangements are known in the prior art for providing a illuminator for a film scanner. One such conventional illuminator is a basic linear integrating cavity which is disclosed in U.S. Pat. No. 4,868,383 (A. Kurtz et al.), issued on Sept. 19, 1989. A basic integrating cylinder has a cylindrical cavity comprising an interior white diffusing surface of high reflectivity, a light entry port, and a light exiting slit. Light from an external source is input into the cylindrical cavity (e.g., at the top or bottom) via an optical system of relay and condensing lenses. The light entry port for the light from the external source is located ninety degrees from the light exiting slit of the cavity. The light scatters throughout the cavity, and exits through the slit (e.g., at the front) to provide diffuse uniform DeJager et al.), issued on Apr. 30, 1991, discloses an illumination system using the conventional linear integrating cavity in a telecine film scanner.

To accomplish the illumination of the film, the integrating cavity must be incorporated into a film gate mechanism. Such film gate, as used in the film scanner shown in FIG. 1 of U.S. Pat. No. 4,868,383, or the telecine film scanner shown in FIG. 1 of U.S. Pat. No. 5,012,346, includes the integrating cavity, the input optical system comprising a complex arrangement of many elements (condensing and relay lenses, mirrors, and filters) for directing the light beam into the integrating cavity, a skid surface on which the film rides, a feedback path from the integrating cavity to a light source, and various film guiding mechanisms to provide film steadiness and registration. Such film gate is a complicated assembly wherein various components are competing for the same space. Therefore, the mechanical design of the film gate involves a careful tradeoff of these conflicting interests.

In FIG. 9 of U.S. Pat. No. 4,868,383 (discussed hereinbefore), there is shown a general concept of an end input illuminated integrating cavity which relieves some of the problem of various components of a film gate competing for the same space. The integrating cavity of FIG. 9 introduces multiple light beams through the opposing ends of the cavity to improve uniformity of the diffuse light at the output slit when the integrating cylinder is in excess of 75 millimeters in length.

In general, a well-optimized end input illuminated integrating cylinder can provide a more uniform diffuse light across the output slit than the conventional integrating cavity shown in FIGS. 1 and 2 of U.S. Pat. No. 4,868,383. However, such end input illuminated integrating cylinder is more complex and requires a knowledge of what is required to optimize such end input illuminated integrating cylinder in order to provide the more uniform diffuse light across the output slit. This patent, however, does not provide an explanation of what is required to set up the various components (e.g., input port to exit slit relationship, light beam configuration, cavity size, etc.) in order to optimize an end input illuminated integrating cylinder.

U.S. Pat. No. 5,103,385 (R. Federico et al.), issued on Apr. 7, 1992, discloses a linear light source arrangement for a film scanner illustrating a second type of illuminator known in the prior art. The linear light source comprises an elongated light integrating cavity having diffusely reflective walls. Light is introduced into the cavity through an input port, and an output beam of diffuse illumination is produced through an output slit parallel to a longitudinal axis of the integrating cavity and opposite (180 degrees) the input port. A baffle is disposed in the cavity parallel to the longitudinal axis to prevent light from passing directly from the input port to the output slit. The surfaces of the integrating cavity walls adjacent the output slit are generally planar and are disposed at an angle to an optical axis of the diffuse output beam.

The linear light source arrangement of U.S. Pat. No. 5,103,385 advantageously shifts the input optics further from a surface on which the film rides. This provides a technique for alleviating the spacing conflicts found with the film gate used in film scanners as indicated hereinabove. However, a baffle is required to avoid the light from exiting the exit slit with a nonuniform distribution. When comparing such integrating cavity arrangement (input port opposite the exit slit) with that of the conventional integrating cavity arrangement (input port at 90 degrees to the exit slit), the former integrating cavity arrangement (of U.S. Pat. No. 5,103,385) is found to be less efficient than the conventional integrating cavity arrangement, and, therefore, may not always be used.

U.S. Pat. No. 4,899,040 (M. Davis et al.), issued on Feb. 6, 1990, and U.S. Pat. No. 4,933,779 (J. Milch), issued on Jun. 12, 1990, disclose an illumination system for an image scanner comprising a bundle of optical fibers and a tube. A beam of light from the light source is intercepted by the bundle of optical fibers which are then unbundled to provide a line of illumination. The tube has a reflective inner surface and defines a light input slit disposed parallel to a longitudinal axis of the tube for receiving the line of illumination from the unbundled optical fibers, and a diffuse light output slit disposed parallel to the input slit. The input and output slits are disposed at 90 degrees from each other around a surface of revolution of the tube.

Care is required in introducing light into any integrating cylinder. For example, uniformity of the light across the output slit, efficiency of the integrating cylinder, and mechanical ease in using the integrating cylinder in a film scanner are some of the elements that must be considered. In this regard, U.S. Pat. No. 5,103,385 uses a baffle which trades some efficiency for mechanical ease, and U.S. Pat. Nos. 4,899,040 and 4,933,779 use integrating cylinders that trade some efficiency for uniformity of the output light and mechanical ease. However, none of the prior art integrating cylinder designs include the three considerations described above.

It is desirable to provide an integrating cavity for an film scanner which provides mechanical ease of use, an extremely uniform line of diffuse light at the output slit, and a maximum efficiency while reducing the complexity of a film gate of a film scanner.

SUMMARY OF THE INVENTION

The present invention is directed to an illuminator for a film scanner comprising an integrating cylinder with off-centered end input illumination that provides mechanical ease of use, an extremely uniform line of diffuse light at an output slit, and a maximum efficiency while reducing the complexity of a film gate of a film scanner.

Viewed from one aspect, the present invention is directed to an integrating cylinder for providing a uniform linear diffuse light for a film scanner. The integrating cylinder comprises a hollow cylinder, a first end plate for sealing a near end of the hollow cylinder, and a second end plate for sealing a far end of the hollow cylinder opposite the near end. The hollow cylinder comprises a reflective light-diffusing inner surface defining a cavity therein, and an outer surface adjacent to a film. Still further, the hollow cylinder defines a slit formed parallel to a longitudinal axis of the hollow cylinder between the inner and outer surfaces at a predetermined line along the outer surface of the hollow cylinder for projecting the uniform linear diffuse light from the integrating cylinder. The first end plate defines a hole which is decentered from the longitudinal axis of the cavity of the hollow cylinder and is at a predetermined angular separation around the cavity from the slit to avoid direct light from the diverging light beam entering the hole in the first end plate from exiting the slit. The first end plate seals a near end of the cavity of the hollow cylinder, and defines a hole which is decentered from the longitudinal axis of the cavity of the hollow cylinder and is disposed at a different predetermined radial angular separation around the cavity from the slit. The hole receives a light beam having a predetermined divergence angle which is directed into the cavity at a predetermined tilt angle to the longitudinal axis of the cavity so that direct light from the diverging light beam does not exit the slit. Rays of the diverging light beam are reflected within the cavity and exit the slit to produce the uniform linear diffuse light.

It is preferable that the integrating cylinder further define a light feedback port between the inner and outer surfaces of the hollow cylinder at a position around the cavity where no direct light is received from the diverging light beam being directed into the cavity at the predetermined tilt angle to the longitudinal axis for receiving a sample of the uniform diffuse light in the cavity. The sample of light is used to provide a feedback signal for controlling power to a light source to substantially avoid fluctuations in the intensity of the diverging light beam entering the cavity through the hole in the first end plate.

Viewed from another aspect, the present is directed to an illuminator for use in a film scanner. The illuminator comprises a light source for generating a diverging light beam, an optical system for receiving the diverging light beam from the light source and focussing the light beam with a predetermined focusing angle, and an integrating cylinder. The integrating cylinder comprises a hollow cylinder, a first end plate for sealing a near end of the hollow cylinder, and a second end plate for sealing a far end of the hollow cylinder opposite the near end. The hollow cylinder comprises a reflective light-diffusing inner surface defining a cavity therein, and an outer surface. Still further, the hollow cylinder defines a slit formed parallel to a longitudinal axis of the hollow cylinder between the inner and outer surfaces at a predetermined line along the outer surface of the hollow cylinder for projecting the uniform diffuse light from the integrating cylinder. The first end plate defines a hole which is decentered from the longitudinal axis of the cavity of the hollow cylinder and is directed at a predetermined tilt angle to the longitudinal axis of the cavity through the first end plate towards a predetermined area of the inner surface of the hollow cylinder. The first end plate seals a near end of the cavity of the hollow cylinder, and defines a hole which is decentered from the longitudinal axis of the cavity of the hollow cylinder and is disposed at a different predetermined radial angular separation around the cavity from the slit. The hole receives a light beam having a predetermined divergence angle which is directed into the cavity at a predetermined tilt angle to the longitudinal axis of the cavity so that direct light from the diverging light beam does not exit the slit. Rays of the diverging light beam are reflected within the cavity and exit the slit to produce the uniform linear diffuse light.

The invention will be better understood from the following more detailed description taken with the accompanying drawings and claims.

The drawings are not necessarily to scale.

DETAILED DESCRIPTION

Figure 1:
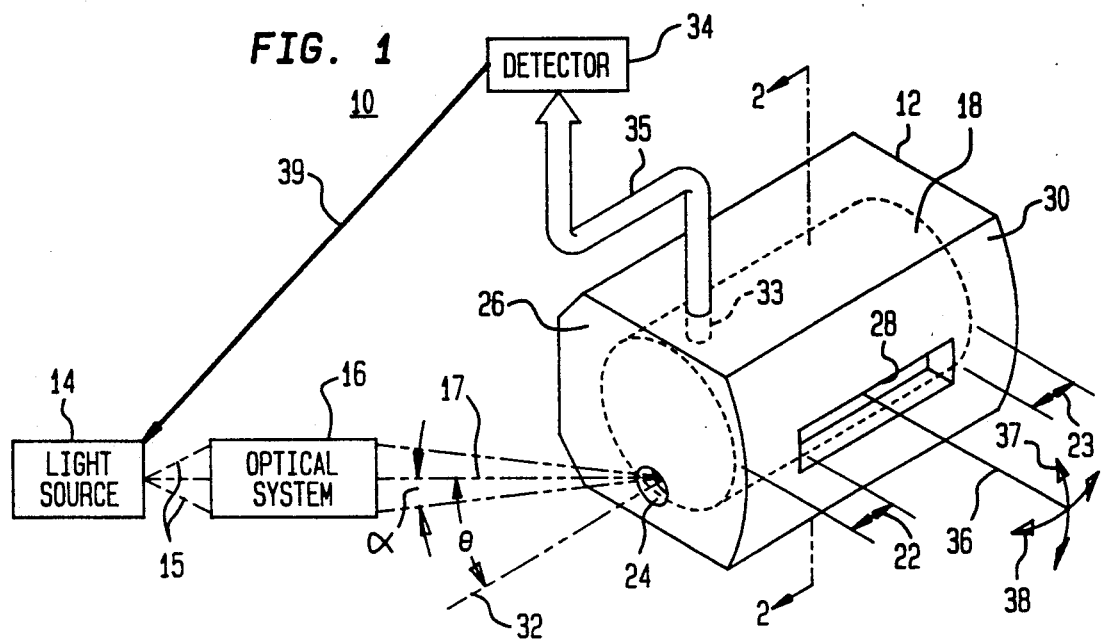
FIG. 1 is a view in perspective of an integrating cylinder for providing a light source for a film scanner in accordance with a preferred embodiment of the present invention.
Figure 2:
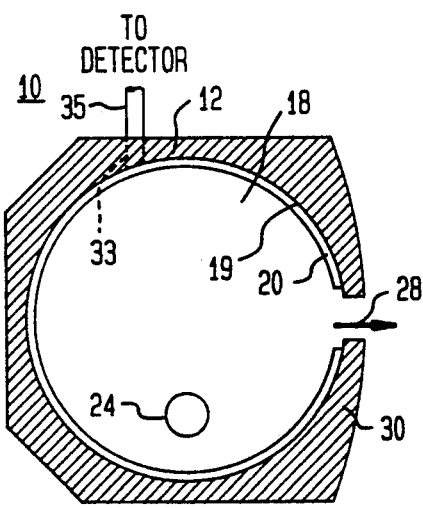
FIG. 2 is a cross-sectional view of the integrating cylinder of FIG. 1.

Referring now to FIGS. 1 and 2, there is shown a view in perspective of an illuminator 10 for a film scanner in accordance with a preferred embodiment of the present invention in FIG. 1, and a cross-sectional view of the illuminator 10 of FIG. 1 along a dashed line 2—2 of FIG. 1 in FIG. 2. The illuminator 10 comprises an integrating cylinder 12 defining a feedback port 33, a light source 14 for generating a diverging light beam 15, an optical system 16 for intercepting the diverging light beam 15 and focusing the light beam 15 along an optical axis 17 towards a predetermined point, and a detector 34. The detector 34 (e.g., a photocell) receives light exiting the feedback port 33 via a feedback path 35 (e.g., an optical fiber) for providing feedback signals via path 39 and illumination control and power supply circuits (shown only in FIG. 11) which control and substantially avoid fluctuations in the intensity of the light beam 15.

The integrating cylinder 12 comprises a circular internal cavity 18 (shown in FIG. 2, and within a dashed line cylinder in FIG. 1) including a highly reflective internal surface 19 (shown only in FIG. 2), a near-end extension 22 of the circular internal surface of the cavity 18, a far-end extension 23 of the circular internal surface of the cavity 18, a first end 26 for sealing the cavity 18 and defining a tilted input port 24 therein, a curved portion 30 of an outer surface which contacts (directly or indirectly) a film (shown only in FIG. 11) being scanned and defines a slit 28 disposed longitudinally between the near-end and far-end extensions 22 and 23, and the feedback port 32 defined in a top of the integrating cylinder 12. Each end of the cavity 18 (e.g., end 26) also includes a highly reflective internal surface 19. It is to be understood that the highly reflective internal surface 19 of the cavity 18 (including the ends thereof) can be obtained using various techniques. For example, the integrating cylinder 12 can be made of a metal such as aluminum and hollowed out to form the cavity 18 which is then coated with, for example, a layer of high reflectivity material 20 such as a white reflective paint. Alternatively, the integrating cylinder can be machined from a non-metallic material such as white Teflon to directly provide a highly reflective internal surface 19 of the cavity 18 without the use of a coating thereon.

The optical axis 17 of the light source 14 and the optical system 16 is disposed at a predetermined angle theta to a line 32 from the center of the input port 24, the line 32 being parallel to a longitudinal axis (not shown) of the integrating cylinder. In a preferred embodiment, the optical axis 17, the line 32, and the angle theta all reside in a common plane that is parallel to the exit slit 28 and that bisects the integrating cylinder cavity 18 and the input port 24. It is to be understood that the optical axis 17 of the light source 14 and the optical system 16 could be rotated at some compound angle theta that tilts the input beam out of this common plane. The optical system 16 is a complex arrangement comprising various elements such as, filters, a filter wheel, a rotatable aperture wheel, and a plurality of relay and condensing lenses in any combination as shown for example, in FIG. 1 of U.S. Pat. No. 5,012,346 (D. DeJager et al.), issued on Apr. 30, 1991. Preferably, the input port 24 is disposed off-center from the longitudinal axis of the integrating cylinder 12, and approximately 90 degrees radially around a circumference of the circular integrating cylinder 12 from the slit 28. It is to be understood that the input port 24 can be disposed off-center within the range of approximately 90 degrees to approximately 120 degrees radially around a circumference of the circular integrating cylinder 12 from the slit 28. However, by changing the position of the input port 24 from a radial angle of approximately 90 degrees to an angle up to approximately 120 degrees from the slit 28, the integrating cylinder 12 is more sensitive to various parameters such as alignment tolerances of components in the optical system 16, alignment of the input beam 15, etc. Therefore, for each changed radial position of the input port 24, changes are required (e.g., changing the tilt angle theta of the input light, etc.) to re-balance the integrating cylinder 12 to obtain uniformity of light distribution along the slit 28 and maintain a predetermined efficiency.

For purposes of explanation, it is assumed hereinafter that the input port 24 is located near a "bottom" of the first end 26 of the cavity 18, where the bottom is defined as being located radially at approximately ninety degrees around the circumference of the cylinder 12 from the slit 28. Furthermore, the input port 24 is directed at the tilt angle theta through the first end 26 along the optical axis 17 to direct the focused beam of light 15 from the optical system 16 towards the bottom of the cavity 18 in the integrating cylinder 12. The feedback port 33 is positioned to only receive light which is reflected within the cavity 18. Therefore, with the beam of light 15 being directed towards the bottom of the cavity 18, the feedback port 33 is positioned, for example, in a top surface of the integrating cylinder 12 to avoid receiving direct light from the light beam 13 entering the input port 24.

In operation, the light source 14 transmits the diverging light beam 15 along the optical axis 17 into the cavity 18 of the integrating cylinder 12 via the optical system 16 and the tilted input port 24 defined in the first end 26 of the integrating cylinder 12. The light beam 15 is focused with a predetermined focusing half angle alpha by the optical system 16 to a point which is preferably just inside the input port 24 so that the beam diverges with a divergence angle alpha inside the cavity 18. The focused, and then diverging, light beam 15 enters the cavity 18 at the tilt angle theta with the beam 15 being directed towards the bottom of the cavity 18. This prevents any light from directly exiting the cavity 18 through the slit 28, and reduces the magnitude of any lobes found in angular profiles from the slit 28 occurring from first reflections from the internal surface 19 (or the reflective layer 20) of the cavity 18. Upon entering the cavity 18, light rays (not shown) from the focused and diverging light beam 15 are reflected a number of times from the internal surface 19 (or the reflective layer 20) to eventually exit the slit 28 and form a diverging line of uniform diffuse light. The portion of the diverging line of uniform diffuse light is depicted in FIG. 1 by a ray 36 normal to a longitudinal axis (not shown) of the slit 28, and lines 37 and 38 formed perpendicular and parallel, respectively, to the longitudinal axis of the slit 28 and normal to the ray 36. Therefore, from each point along the slit 28, the light is diverging to form a line of uniform diffuse light.

It is to be understood that the dimensions used for designing the integrating cylinder 12 are dependent on the details of the tilt angle theta of the input light beam 15 and spatial distributions of the light beam, which may vary from case to case. Furthermore, it is to be understood that there is a range of solutions which are dependent on how the combinations of the efficiency of the cavity 18, the spatial uniformity across the slit 28, and the angular profiles of the light from the slit 28 are traded off.

In optimizing the design of the integrating cylinder 12, the geometry of the cavity 18 (the diameter of the cavity 1B, the width of the slit 28, and the length of the slit 28) is initially determined. For such geometry of the cavity 18, the tilt angle theta of the input beam 15, the amount of decentering of the input port 24 (radially from the center of the cavity 18), the length of the near-end and far-end extensions 22 and 23, and the divergence angle alpha of the input beam 15 in the cavity 18 are each varied until the integrating cylinder 12 is optimized. Preferably, the divergence angle alpha of the input beam 15 in the cavity 18 is set, and then the tilt angle theta, the amount of decentering, and the length of the extensions 22 and 23 are varied until the integrating cylinder 12 is optimized. Such preferred optimization technique provides a range of solutions (using tilt angles theta, input port 24 decentering, and end extensions 22 and 23 sizes within a small range) that provide substantially equal performance.

More particularly, for a small divergence angle (alpha) the optimization of the integrating cylinder is made more difficult. As the divergence angle alpha is made larger, less tilt angle theta, input port 24 decentering, and near-end and far-end extensions 22 and 23 length are needed. For example, for a predetermined sized cavity 18 with a tilt angle theta of 20 degrees, the light beam divergence angle alpha is 20 degrees. However, for a same sized cavity 18 with a beam divergence angle alpha is 28 degrees, the tilt angle theta can be in the range of 10-15 degrees. There are two upper limits for providing more beam divergence (angle alpha). These upper limits are dependent on the maximum focusing angle alpha of light that the optical system 16 can reasonably deliver, and the ability to avoid light from propagating directly between the input port 24 and the slit 28.

It is to be understood that it is beneficial not only to angle the input light beam 15 via input port 24 towards the bottom of the cavity 18 with a predetermined focusing angle alpha, but to also decenter the input port 24 towards the bottom of the cavity 18. This has the effect of filling in a drop-off in an output spatial light profile of the slit 28 adjacent the near end extension 22 (that is, making the spatial profile more uniform). Although the near-end and far-end extensions 22 and 23 of the cavity 18 are optional, the near-end extension 22 improves a near-end spatial profile for increased diffuse light uniformity and is, therefore, preferred. Additionally, the near-end and far-end extensions 22 and 23 of the cavity 18 allow more freedom in the choice of tilt, decentering, and beam divergence for the input port 24 for only a slight loss in efficiency of the cavity 18.

Figure 3:
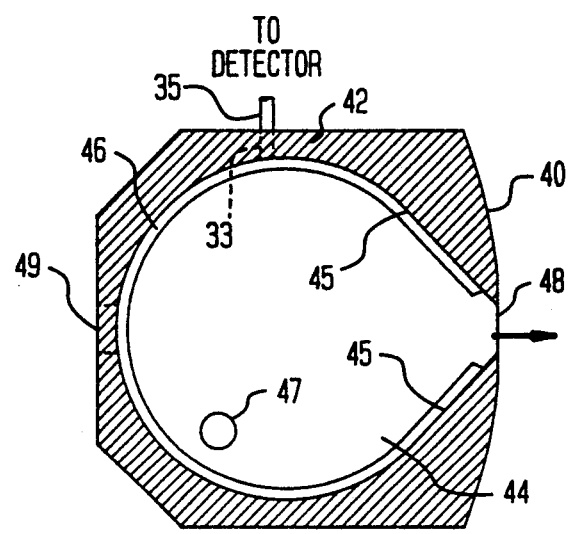
FIG. 3 is a cross-sectional view of an alternate configuration for the integrating cylinder of FIG. 1 in accordance with a second embodiment of the present invention.

Referring now to FIG. 3, there is shown a cross-sectional view of an integrating cylinder 42 in accordance with a second embodiment of the present invention. The integrating cylinder 42 can be substituted for integrating cylinder 12 of FIG. 2. The integrating cylinder 42 defines an internal cavity 44 and a light beam input port 47 near the bottom of a near end of the integrating cylinder 42, and comprises an internal surface 45 which is highly reflective by itself or includes a layer of high reflectivity material 46 formed thereon, and an outer surface 49 which defines a slit 48 therein. The cavity 44 has a cross-section in the form of a teardrop which is essentially circular and elongates outward at a portion of the outer surface 49 where the slit 48 is defined. The input port 47 is angled toward the bottom of the cavity 44 as described for the input port 24 of FIG. 1. The teardrop end input illuminated integrating cylinder 42 of FIG. 3 provides a greater internal surface 45 area for the cavity 44 than found with the cylindrical cavity 18 of FIG. 2. This leads to a less efficient cavity 44.

It is to be understood that it is preferred that the cross-section of the cavity 44 be circular as shown in FIG. 2, but that the cross-section can be altered to a certain extent away from being purely circular as shown, for example, in FIG. 3. However, there is a point where the alteration of the cross section of the cavity 44 away from being purely circular no longer provides efficient and proper operation.

For purposes of illustration, an exemplary illuminator 10 of FIGS. 1 and 2 comprises a circular cylindrical cavity 18 having a diameter of 20 millimeters and a length of 31 millimeters. The longitudinal output slit 28 is centered in the surface 30 of the integrating cylinder 12 and has a length of 27 millimeters and a width of 2.8 millimeters. Thus, the cavity 18 has nearend and far-end extensions 22 and 23 which are each two millimeters in length. The cavity is machined from Spectralon plastic which is available from Labsphere. The diameter of the input port 24 is 7 millimeters, and appears elliptical in shape when looking at the end 26 since the input port 24 is bored into the end 26 at the tilt angle theta. With such dimensions, the input light beam 15 with a beam divergence angle alpha of approximately 20 degrees should be tilted at an angle theta within a range of 10-30 degrees towards the bottom of the cavity 18. Additionally, the input port 24 should be decentered towards the bottom of the cavity 18 within a range of 3-6 millimeters.

Figure 4:
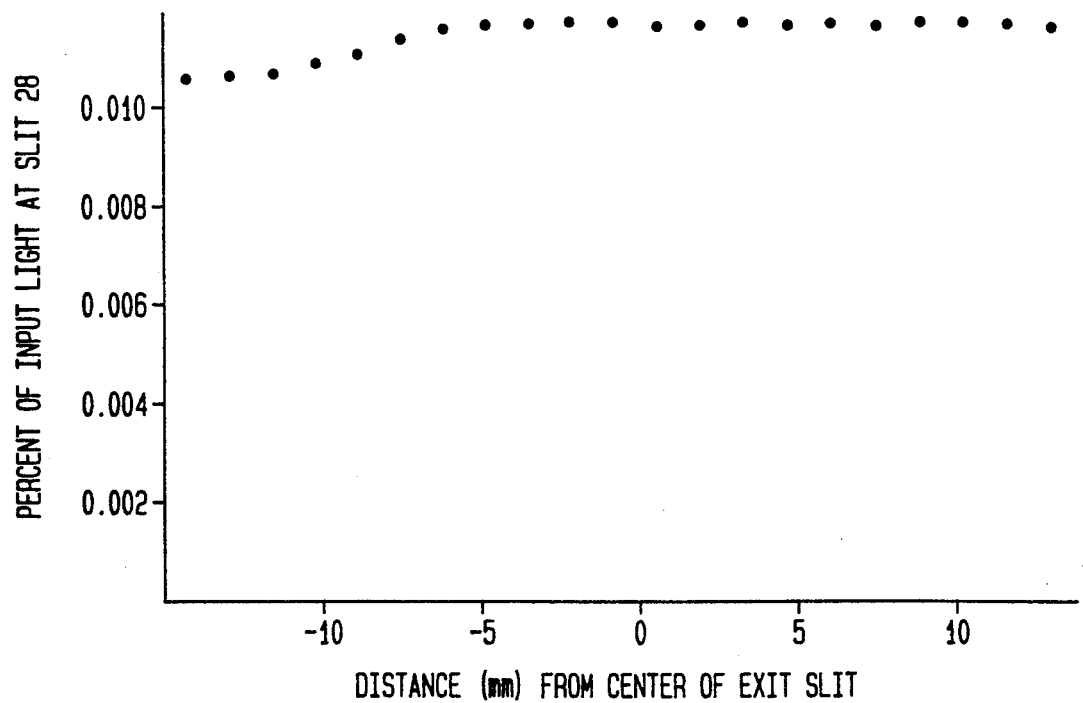
FIG. 4 is a plot of a spatial profile for an exemplary sized integrating cylinder of FIG. 1 along a longitudinal axis of a diffuse light exit slit.

Referring now to FIG. 4, there is shown a plot of data points of a spatial profile of an exemplary sized integrating cylinder 12 of FIG. 1 along a longitudinal axis of the slit 28. The vertical axis of FIG. 4 indicates the percent of the input light that occurs at the slit 28 while the horizontal axis indicates the distance in millimeters from the center (0 millimeters) of the output slit 28. More particularly, the plot of FIG. 4 is for the exemplary integrating cylinder 12 of FIGS. 1 and 2 having the dimensions described hereinabove (e.g., slit 28 has a length of 27 millimeters) with a 20 degree tilt (angle theta) and a 20 degree divergence angle (alpha) of the input beam 15 towards the bottom surface of the cavity 18, and a 4 millimeter decentering of the input port 24 towards the bottom surface of the cavity 18. The plot of FIG. 4 shows that the spatial profile across the slit 28 is substantially uniform. In other words, the percentage of exiting diffuse light found at various points along the slit 28 from the center thereof is substantially uniform.

Figure 5:
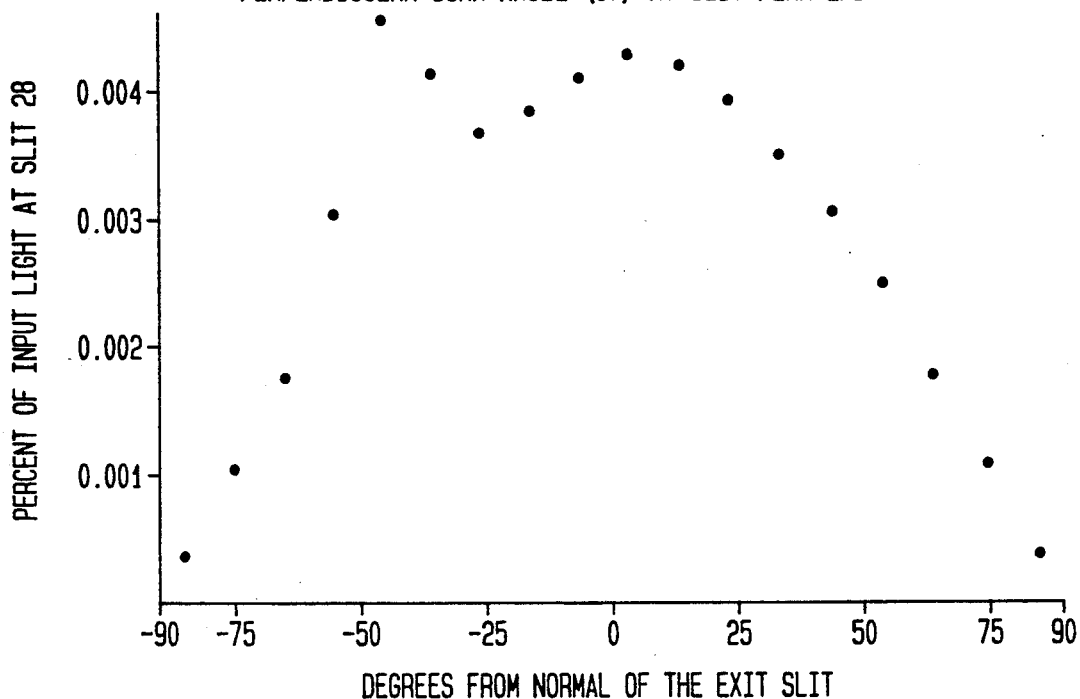
FIG. 5 is a plot of data points for an angular profile at a near end of a slit in an exemplary sized integrating cylinder of FIG. 1 in a scan direction normal to a longitudinal axis of the diffuse light exit slit.
Figure 6:
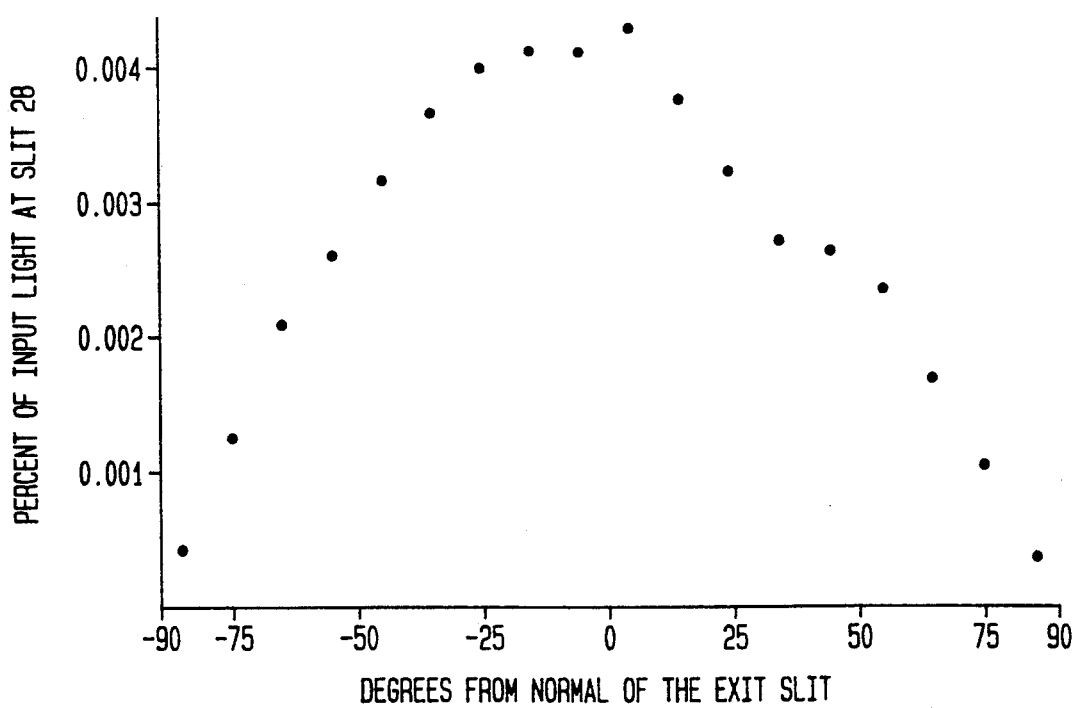
FIG. 6 is a plot of data points for an angular profile at a near end of a slit in an exemplary sized integrating cylinder of FIG. 1 in a scan direction parallel to a longitudinal axis of the diffuse light exit slit.

Referring now to FIGS. 5 and 6, there is shown in FIG. 5 a plot of data points for an angular profile of the exemplary sized integrating cylinder 12 of FIGS. 1 in a scan direction normal to a longitudinal axis of the slit 28 (e.g., along line 37 of FIG. 1) at a near-end of the slit 28 (adjacent the near-end extension 22), and there is shown in FIG. 6 a plot of input port 24 data points for an angular profile of the exemplary sized integrating cylinder 12 of FIG. I described hereinabove in a scan direction parallel to a longitudinal axis of a slit 28 (e.g., along line 38 of FIG. 1) at the near-end of the slit 28. More particularly, the plots of FIGS. 5 and 6 are for the exemplary integrating cylinder 12 of FIGS. 1 and 2 having the dimensions described hereinbefore with a 20 degree tilt (angle theta) and a 20 degree divergence angle (alpha) of the input beam 15 towards the bottom surface of the cavity 18, and a four millimeter decentering of the input port 24 towards the bottom surface of the cavity 18. The angular profiles of FIGS. 5 and 6 are not perfectly lambertian (follow a cosine distribution) as there are small features from first reflection leakage (e.g., found at −25 to −50 degrees in FIG. 5). However, the magnitude of these features is small.

Figure 7:
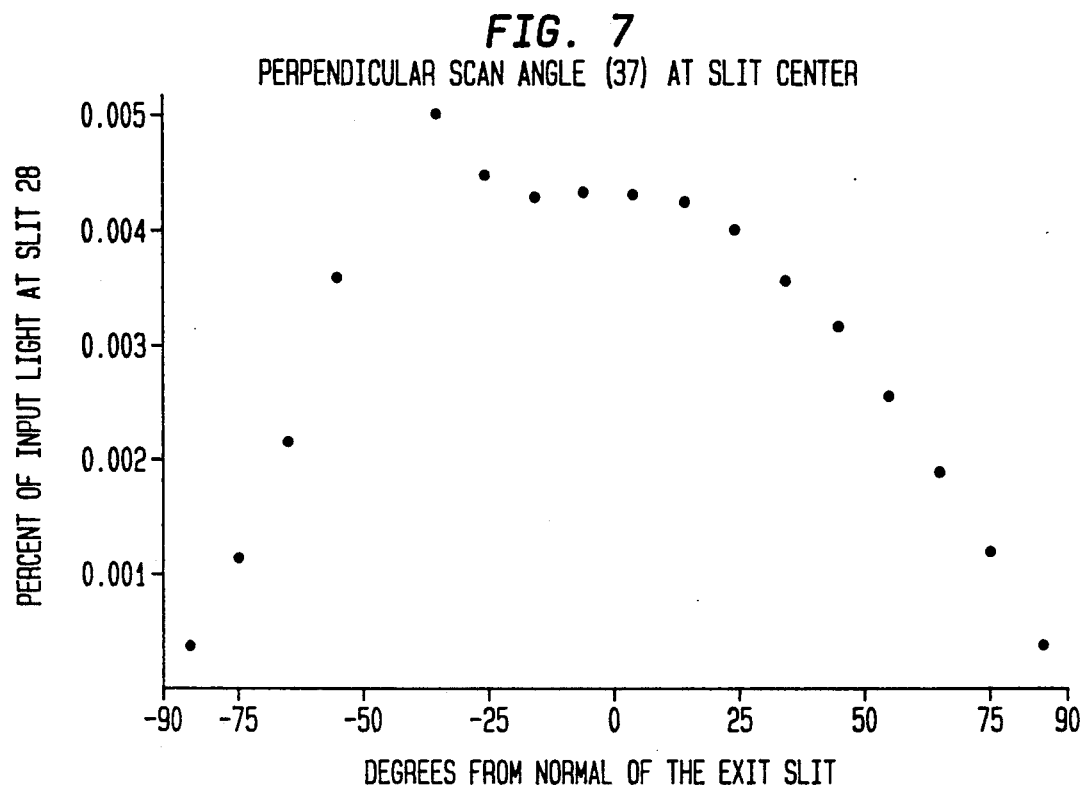
FIG. 7 is a plot of data points for an angular profile at a center of a slit in an exemplary sized integrating cylinder of FIG. 1 in a scan direction normal to a longitudinal axis of the diffuse light exit slit.
Figure 8:
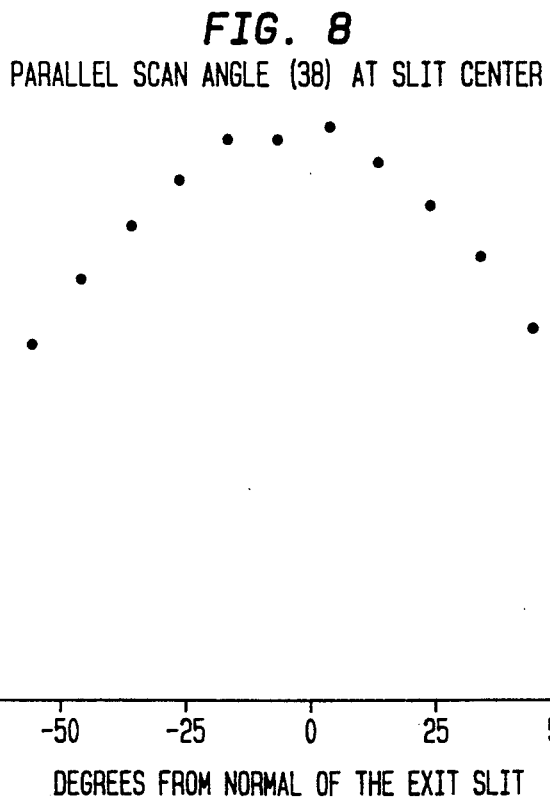
FIG. 8 is a plot of data points for an angular profile at a center of a slit in an exemplary sized integrating cylinder of FIG. 1 in a scan direction parallel to a longitudinal axis of the diffuse light exit slit.

Referring now to FIGS. 7 and 8, there is shown in FIG. 7 a plot of data points for an angular profile of the exemplary sized integrating cylinder 12 of FIG. 1 in a scan direction normal to a longitudinal axis (e.g., along line 37 of FIG. 1) of a slit 28 at a center of the slit 28, and there is shown in FIG. 8 a plot of data points for an angular profile of the exemplary sized integrating cylinder 12 of FIG. 1 described hereinabove in a scan direction parallel to a longitudinal axis (e.g., along line 38 of FIG. 1) of a slit 28 at the enter of the slit 28. More particularly, the plots of FIGS. 7 and 8 are for the exemplary integrating cylinder 12 of FIGS. 1 and 2 having the dimensions described hereinbefore with a 20 degree tilt (angle theta) and a 20 degree divergence angle (alpha) of the input beam 15 towards the bottom surface of the cavity 18, and a four millimeter decentering of the input port 24 towards the bottom surface of the cavity 18. As with the plots of FIGS. 5 and 6, the angular profiles of FIGS. 7 and 8 are not perfectly lambertian as there are small features from first reflection leakage (e.g., found at −25 to −50 degrees in FIG. 7). However, the magnitude of these features is small.

Figure 9:
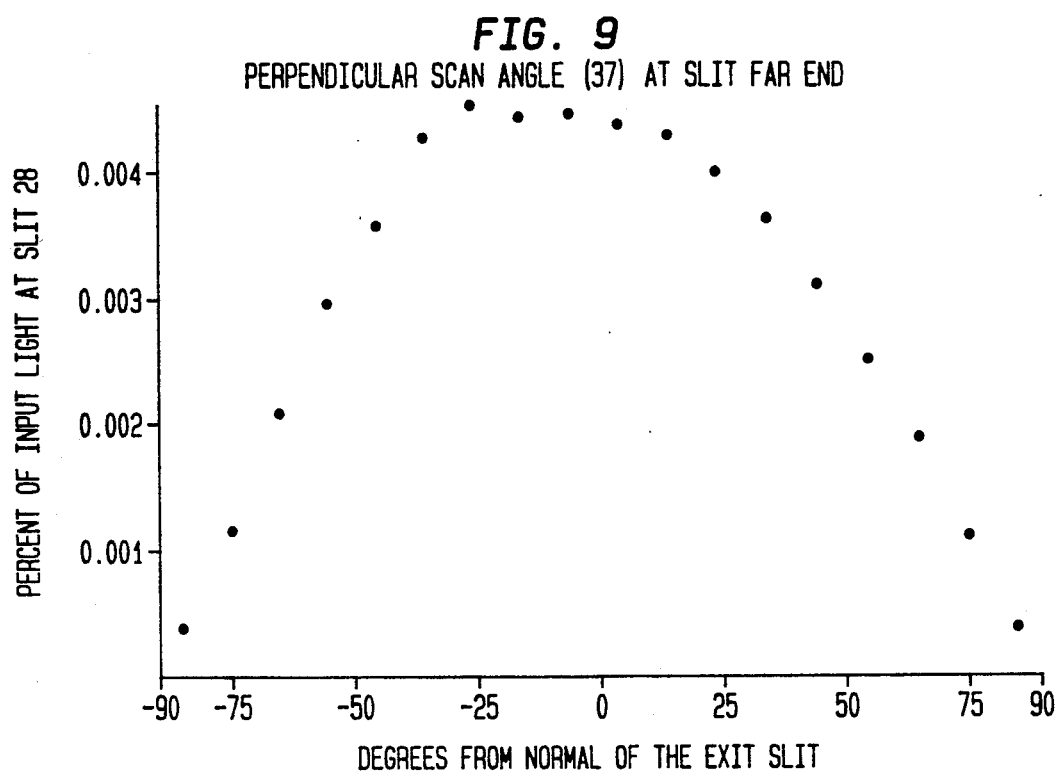
FIG. 9 is a plot of data points for an angular profile at a far end of a slit in an exemplary sized integrating cylinder of FIG. 1 in a scan direction normal to a longitudinal axis of the diffuse light exit slit.
Figure 10:
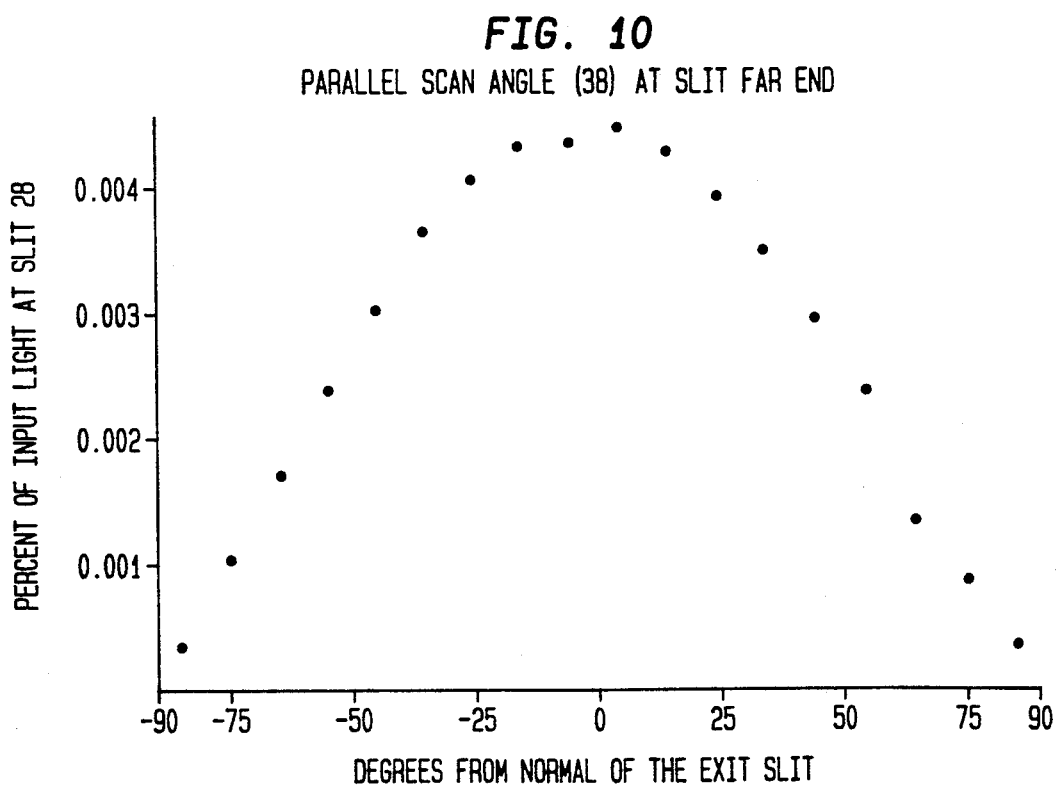
FIG. 10 is a plot of data points for an angular profile at a far end of a slit in an exemplary sized integrating cylinder of FIG. 1 in a scan direction parallel to a longitudinal axis of the diffuse light exit slit.

Referring now to FIGS. 9 and 10, there is shown in FIG. 9 a plot of data points for an angular profile of the exemplary sized integrating cylinder 12 of FIG. 1 in a scan direction normal to a longitudinal axis (e.g., along line 37 of FIG. 1) of a slit 28 at a far-end of the slit 28 (adjacent far-end extension 23), and there is shown in FIG. 10 a plot of data points for an angular profile of the exemplary sized integrating cylinder 12 of FIG. 1 described hereinabove in a scan direction parallel to a longitudinal axis (e.g., along line 38 of FIG. 1) of a slit 28 at the far-end of the slit 28. More particularly, the plot of FIGS. 9 and 10 are for the exemplary integrating cylinder 12 of FIGS. 1 and 2 having the dimensions described hereinbefore with a 20 degree tilt (angle theta) and a 20 degree divergence angle (alpha) of the input beam 15 towards the bottom surface of the cavity 18, and a four millimeter decentering of the input port 24 towards the bottom surface of the cavity 18. As with the angular profiles of FIGS. 5 and 6, the angular profiles of FIGS. 9 and 10 are not perfectly lambertian as there are small features from first reflection leakage (e.g., found at −25 to −50 degrees in FIG. 9). However, the magnitude of these features is small.

Figure 11:
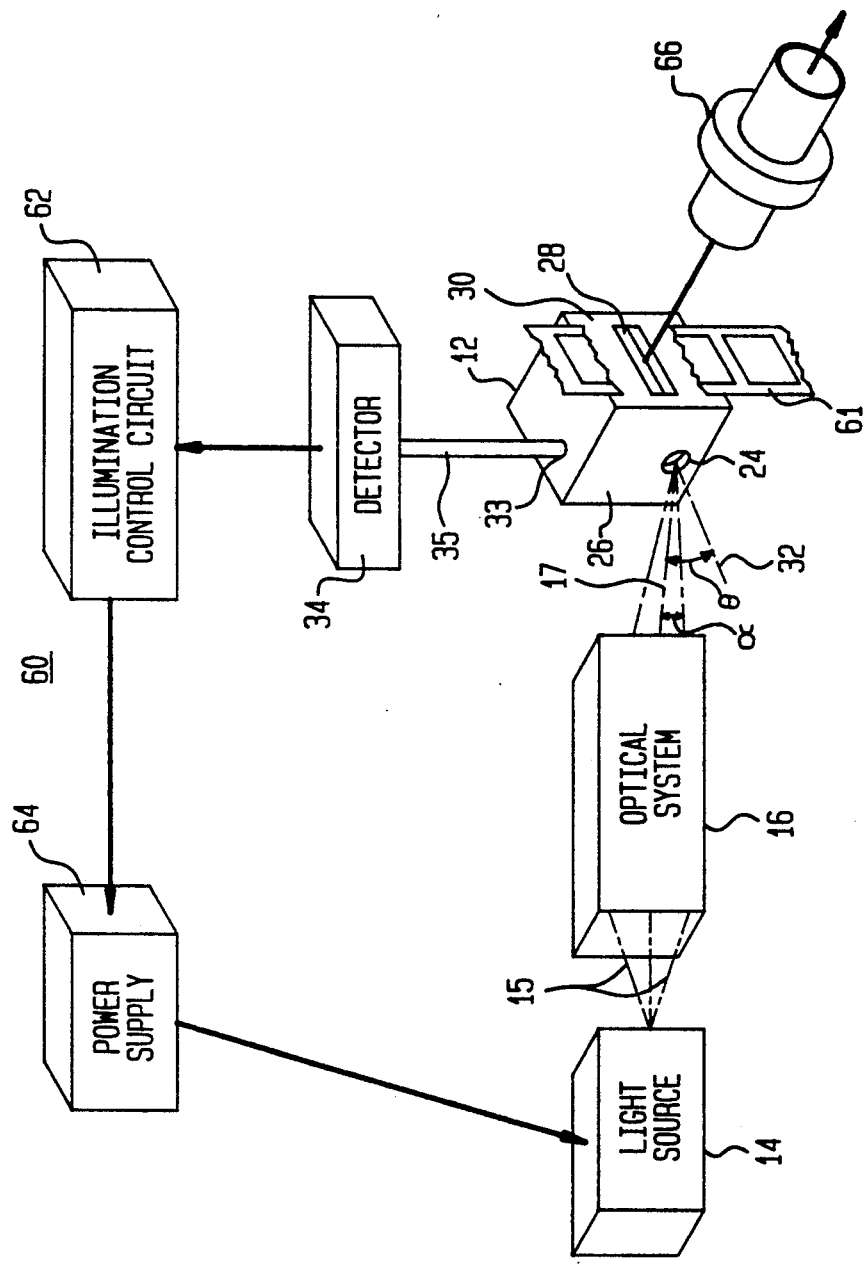
FIG. 11 is a view in perspective of a block diagram of a film scanner in accordance with the present invention.

Referring now to FIG. 11, there is shown a view in perspective of a block diagram of a film scanner 60 including the integrating cylinder 12 of FIG. 1 in accordance with the present invention. The film scanner comprises the light source 14 that generates the diverging light beam 15, the optical system 16 which focuses the light beam 15 along the optical axis 17, the integrating cylinder 12 defining each of the light input port 24, the exit slit 28 in the curved surface 30 on which a film 61 rides, and the feedback port 33, the detector 34 for receiving optical feedback signals from the feedback port 33 via the feedback path 35, an illumination control circuit 62, a power supply 64, and a projection lens 66. The detector 34 is coupled to power supply 64 via the illumination control circuit 62, and the power supply 64 supplies power to the light source 14

The diverging light beam 15 from the light source 14 enters the optical system 16 and is focused into the input port 24 of the integrating cylinder 12 at a tilt angle theta with a focusing angle alpha. As stated hereinbefore, the optical system 16 is a complex arrangement comprising various elements such as, filters, a filter wheel, a rotatable aperture wheel, and a plurality of relay and condensing lenses in any combination as shown for example, in FIG. 1 of U.S. Pat. No. 5,012,346 (D. DeJager et al.), issued on Apr. 30, 1991. The focused light beam enters the input port 24 with a divergence angle alpha and is reflected by the reflective cavity surface 19 to generate a uniform diffuse light which exits both of the slit 28 in the curved surface 30 and the feedback port 33. Light from the slit 28 in the surface 30 of the integrating cylinder 12 is modulated by the film 61 in accordance, for example, with the amounts of cyan, yellow, and magenta dye in the film. The projection lens 66 directs the modulated light beam to elements (not shown) such as beam splitters, filters, and light pickup devices to process or view the modulated light beam.

The feedback port 33 is provided in the cavity 18 (shown in FIG. 2) to remove a sample of the diffuse light within the cavity 18. The light exiting the feedback port 33 is directed by means of the optical fiber 35 to the detector 34 which can be a silicon photodiode. The output from the detector 34 is an electrical signal representative of the amount of light received by the detector 34. The illumination control circuit 62 receives the electrical signal from the detector 34 and converts this signal into a representative control signal for transmission to the power supply 64. The power supply 64 uses the control signal from the illumination control signal 62 to control the power to the light source 14 and thereby control and substantially avoid fluctuations in the intensity of the light beam 15.

The illuminator 10 of FIG. 1 provides industrial applicability and advantages. More particularly, the integrating cylinder 12 (FIGS. 1 and 2) and 42 (FIG. 3) provide a design which simplifies a film gate formed by the illuminator 10. Still further, the illuminator 10 provides a broad range of solutions which are dependent on how the combinations of the efficiency of the cavity 18, the spatial uniformity across the slit 28, and the angular profiles of the light from the slit 28 are traded off. Furthermore, the illuminator 10 provides a line of diffuse light from the slit 28 which is more uniform than the line of diffuse light produced by majority of other integrating cylinders (e.g., as disclosed in U.S. Pat. No. 4,868,383).

It is to be appreciated and understood that the specific embodiments of the invention described hereinabove are merely illustrative of the general principles of the invention. Various modifications may be made by those skilled in the art which are consistent with the principles set forth. For example, configurations for the cavity 18 other than those shown in FIGS. 2 and 3 can be used. Still further, the tilt of the input beam 15 can also be applied to other complex cavity configurations to improve its performance. Furthermore, the decentering of the input light port 24 can also be applied to other complex cavity configurations. Still further, the input port can be directed towards the top of the cavity 18 and the feedback port 33 can then be located in the bottom of the cavity.

What is claimed is:

1. An integrating cylinder for providing a uniform linear diffuse light for a film scanner comprising:

a hollow cylinder comprising a reflective light-diffusing inner surface defining a cavity therein and an outer surface adjacent to a film, and defining a slit formed parallel to a longitudinal axis of the cavity between the inner and outer surfaces at a predetermined line along the outer surface of the hollow cylinder for projecting the uniform linear diffuse light from the integrating cylinder;

a first end plate for sealing a near end of the cavity of the hollow cylinder, and defining a hole which is decentered from the longitudinal axis of the cavity of the hollow cylinder and is disposed at a different predetermined radial angular separation around the cavity from the slit for receiving a light beam having a predetermined divergence angle which is directed into the cavity at a predetermined tilt angle to the longitudinal axis of the cavity so that direct light from the diverging light beam does not exit the slit and produces a substantially uniform intensity of light across the slit defined by the hollow cylinder; and a second imperforate end plate for sealing a far end of the cavity of the hollow cylinder opposite the near end.

2. The integrating cylinder of claim 1 wherein the hollow cylinder further defines a light feedback port between the inner and outer surfaces of the hollow cylinder for receiving a sample of the uniform diffuse light in the cavity, the light feedback port being disposed at a position around the cavity where no direct light is received from the diverging light beam being directed into the cavity at the predetermined tilt angle to the longitudinal axis.

3. The integrating cylinder of claim 1 further comprising light generating means for generating a focused light beam which is directed into the hole of the first end plate at a predetermined tilt angle to the longitudinal axis of the cavity towards an area of the inner surface of the hollow cylinder which is at a second predetermined angular separation around the circumference of the cavity from the slit.

4. The integrating cavity of claim 3 wherein the hole in the first end plate is tilted at the predetermined tilt angle to the longitudinal axis of the cavity through the first end plate.

5. The integrating cylinder of claim 1 wherein the cavity has a circular cross-section.

6. The integrating cylinder of claim 1 wherein the cavity has a teardrop cross-section.

7. The integrating cylinder of claim 1 wherein the predetermined radial angular separation of the hole from the slit around the circumference of the hollow cylinder is substantially ninety degrees.

8. The integrating cavity of claim 1 wherein the hollow cylinder further comprises a near end extension and a far end extension of the cavity which separates the slit from the fist and second end plates, respectively.

9. An illuminator for providing a uniform diffuse light in a film scanner comprising:

a light source for generating a diverging light beam;
an optical system for receiving the diverging light beam from the light source and focussing the light beam with a predetermined focusing angle; and
an integrating cylinder comprising:

a hollow cylinder comprising a reflective lightdiffusing inner surface defining a cavity therein, and an outer surface adjacent to a film, and defining a slit formed parallel to a longitudinal axis of the cavity between the inner and outer surfaces of the hollow cylinder at a predetermined line along the outer surface of the hollow cylinder for projecting the uniform diffuse light from the integrating cylinder;

a first end plate for sealing a near end of the cavity of the hollow cylinder, and defining a hole which is decentered from the longitudinal axis of the cavity of the hollow cylinder and is disposed at a different predetermined radial angular separation around the cavity from the slit for receiving a light beam having the predetermined divergence angle which is directed at the predetermined tilt angle into the cavity so that direct light from the light beam does not exit the slit and produces a substantially uniform intensity of light across the slit defined by the hollow cylinder; and a second imperforate end plate for sealing a far end of the cavity of the hollow cylinder opposite the near end.

10. The illuminator of claim 9 wherein the hollow cylinder of the integrating cylinder further defines a light feedback port for receiving a sample of the uniform diffuse light in the cavity, the light feedback port being disposed between the inner and outer surfaces of the hollow cylinder at a radial position around the cavity where no direct light is received from the diverging light beam being directed into the cavity at the predetermined tilt angle to the longitudinal axis.

11. The illuminator of claim 10 further comprising:
a detector for receiving the sample of the uniform diffuse light from the light feedback port and generating a control signal for controlling the power to the light source to substantially avoid fluctuations in light intensity in the light beam from the light source.

12. The illuminator of claim 9 wherein the light source and the optical means direct the focused light beam into the hole of the first end plate at a predetermined tilt angle to the longitudinal axis of the cavity towards an area of the inner surface of the hollow cylinder which is at a second predetermined angular separation around the circumference of the cavity from the slit.

13. The integrating cavity of claim 12 wherein the hole in the first end plate is tilted at the predetermined tilt angle to the longitudinal axis of the cavity through the first end plate.

14. The integrating cavity of claim 9 wherein the hollow cylinder has a circular cross-section.

15. The integrating cavity of claim 9 wherein the hollow cylinder has a teardrop cross-section.

16. The integrating cavity of claim 9 wherein the predetermined radial angular separation of the hole from the slit around the circumference of the hollow cylinder is substantially ninety degrees.

17. The integrating cavity of claim 9 wherein the hollow cylinder further comprises a near end extension and a far end extension of the cavity which separates the slit from the first and second end plates, respectively.

* * * * *